United States Patent
Ferri et al.

(10) Patent No.: US 6,460,175 B1
(45) Date of Patent: Oct. 1, 2002

(54) PROGRAM PRODUCT FOR MODULAR, PARALLEL, REMOTE SOFTWARE INSTALLATION WITH REPEATABLE, EXTERNALLY-INVOCABLE STEPS

(75) Inventors: Richard Ferri, Ulster Park; Richard C. Russell, Red Hook, both of NY (US)

(73) Assignee: International Business Machines Corporation, Armonk, NY (US)

(*) Notice: Subject to any disclaimer, the term of this patent is extended or adjusted under 35 U.S.C. 154(b) by 652 days.

(21) Appl. No.: 08/896,923

(22) Filed: Jul. 18, 1997

(51) Int. Cl.[7] .................................................. G06F 9/44
(52) U.S. Cl. ........................ 717/103; 717/100; 717/101; 717/124; 717/129
(58) Field of Search ...................... 395/712, 200.51; 717/11, 100, 103, 101, 124, 129

(56) References Cited

U.S. PATENT DOCUMENTS

| | | | |
|---|---|---|---|
| 5,142,680 A | | 8/1992 | Ottman et al. ......... 395/200.47 |
| 5,359,730 A | * | 10/1994 | Marron ........................ 395/712 |
| 5,421,009 A | * | 5/1995 | Platt ........................ 395/200.51 |
| 5,452,454 A | | 9/1995 | Basu ............................. 395/652 |
| 5,471,617 A | | 11/1995 | Farrand et al. .............. 395/700 |
| 5,537,598 A | | 7/1996 | Kukula et al. .............. 395/712 |
| 5,555,416 A | * | 9/1996 | Ownes et al. ............... 396/712 |
| 5,577,244 A | | 11/1996 | Killebrew et al. .......... 395/703 |
| 5,586,304 A | | 12/1996 | Stupek, Jr. et al. ......... 395/712 |
| 5,649,112 A | | 7/1997 | Yeager et al. ............ 395/200.5 |
| 5,664,195 A | | 9/1997 | Chatterji ..................... 395/712 |
| 5,671,356 A | | 9/1997 | Wang ..................... 395/200.52 |
| 5,742,829 A | | 4/1998 | Davis et al. ................. 395/712 |
| 5,758,345 A | | 5/1998 | Wang ......................... 707/100 |
| 5,761,380 A | | 6/1998 | Lewis et al. ................... 706/47 |
| 5,790,796 A | | 8/1998 | Sadowsky .............. 395/200.51 |
| 5,799,149 A | | 8/1998 | Brenner et al. ......... 395/200.31 |
| 5,805,891 A | | 9/1998 | Bizuneh et al. ............. 395/704 |
| 5,825,649 A | | 10/1998 | Yoshimura ................... 364/187 |
| 5,845,090 A | | 12/1998 | Collins, III et al. .... 395/200.51 |
| 5,852,735 A | | 12/1998 | Urban ........................ 395/712 |
| 5,854,896 A | | 12/1998 | Brenner et al. ........ 395/200.51 |
| 5,860,012 A | | 1/1999 | Luu ........................... 395/712 |
| 5,867,713 A | | 2/1999 | Shrader et al. ............. 395/712 |

OTHER PUBLICATIONS

"Ignite–UX Cold Installation", Steve Bennett, HP, Conference Sessions, InterWorks 97, Conference & Exhibition, Apr. 12–17, 1997.
"Ignite Beta Test", William Campillo, CSC, Conference Sessions, InterWorks 97, Conference & Exhibition, Apr. 12–17, 1997
Ignite–UX Case Studies, Joe Grim, HP, Conference Sessions, InterWorks 97, Conference & Exhibition, Apr. 12–17, 1997.
"Installing HP–UX With Ignite", William Campillo, CSC, COPS., Mar. 3, 1997.
"Configuring the Ignite Server", William Campillo, CSC, COPS, 1997.

* cited by examiner

Primary Examiner—Gregory Morse
Assistant Examiner—Chameli C. Das
(74) Attorney, Agent, or Firm—Lawrence D. Cutter; Floyd A. Gonzalez; Heslin Rothenberg Farley & Mesiti PC

(57) ABSTRACT

A program product recorded on a computer readable medium in which the program product includes a method of performing a software operation on a target of one or more processors in a distributed processing system wherein another processor is designated as a server. The method includes running a configuration program on the server to condition the server to serve on the target, the software operation which includes resource creation and object definitions; testing entry conditions in the configuration program for determining if entry conditions are met to serve the software operation on the target; if the entry conditions are met, serving the software operation on the target; at the completion of the software operation, testing exit conditions in the configuration program for determining if the software operation on the target completed successfully; if the exit conditions are met, exiting the software operation; returning to the configuration program to serve a second software operation on the target; and repeating until all software operations are served on the target.

4 Claims, 4 Drawing Sheets

PROGRAM PRODUCT FOR MODULAR, PARALLEL, REMOTE SOFTWARE INSTALLATION WITH REPEATABLE, EXTERNALLY-INVOCABLE STEPS

BACKGROUND OF THE INVENTION

The present invention relates to executing software on a parallel, distributed data processing system, and more particularly relates to performing a software operation on one or more nodes of a parallel, distributed data processing system.

U.S. Pat. No. 5,359,730 issued Oct. 25, 1994 to Marron for METHOD OF OPERATING A DATA PROCESSING SYSTEM HAVING A DYNAMIC SOFTWARE UPDATE FACILITY and discloses non-disruptive installation of updated portions of a computer operating system while that operating system continues to run while simultaneously supporting application load on the system.

U.S. Pat. No. 5,421,009 issued May 30, 1995 to Platt for METHOD OF REMOTELY INSTALLING SOFTWARE DIRECTLY FROM A CENTRAL COMPUTER and deals with remote installation of software on a computer system. Disclosed is a method of installing a client portion of client-server software on client nodes without first manually preparing those client nodes with any type of software such as download software.

U.S. Pat. No. 5,471,617 issued Nov. 28, 1995 to Farrand et al. for COMPUTER MANAGEMENT SYSTEM AND ASSOCIATED MANAGEMENT INFORMATION BASE and discloses a method of managing a plurality of networked manageable devices, with a management information base for use in managing hardware objects.

U.S. Pat. No. 5,555,416 issued Sep. 10, 1996 to Owens et al. for AUTOMATED SOFTWARE INSTALLATION AND OPERATING ENVIRONMENT CONFIGURATION FOR A COMPUTER SYSTEM BASED ON CLASSIFICATION RULES and is directed to remote, automated, rules based installation to automatically install software products on a computer system, and configure the operating environment of the computer system.

AIX NETWORK INSTALLATION MANAGEMENT GUIDE AND REFERENCE, SC23-1926-00, available from International Business Machines Corporation, provides information about managing the installation and configuration of software by using a network interface. Network Installation Management (NIM) enables the centrally managed installation of the AIX base operating system, the IBM version of the UNIX operating system, and optional software on machines within a networked environment.

The installation of operating system software on parallel, distributed computing system hardware is typically a complex and time consuming procedure. For a modern, full-functioning operation system such as the AIX operating system, numerous files must be placed on the system. As well, numerous files must be newly created or updated, numerous procedures must execute to successful completion on the involved systems, and other complex functions must be completed. NIM provides the base function to install a single system remotely, that is without requiring direct interaction with the target system. The IBM Parallel System Support Program (PSSP version 2.1) utilizes NIM to provide parallel, remote installation of multiple systems. PSSP installation provides automated installation of multiple systems from a single point of control. Much of the PSSP function is embodied in a single program which invokes numerous NIM, Kerberos and other PSSP functions to configure the installation server system to prepare it to install its client system(s).

However, due to the complexity of the installation process, the networking requirements of both the master and client (target) systems, and the complexity of configuring the installation server system, the installation of a remote system can fail for any of a large variety of reasons. In particular, because the installation server configuration function is contained within a single program which does not record the various states through which the server has progressed, if the installation fails the server and client systems can be left in such a state as to require significant detailed analysis and manual intervention to restore the systems to their previous states. It is not always possible to correct the initial problem and rerun the program because the various states through which the server is progressed are not recorded. Thus, it takes careful analysis and effort to restore the server to its original state. Even in cases where the server configuration program can be rerun, it consumes unnecessary time and resources to rerun all configuration steps when only the remaining steps need be completed.

SUMMARY OF THE INVENTION

The present invention builds upon the existing base of NIM and PSSP version 2.1. The single installation server configuration program is replaced with a collection of single-function programs, each of which performs a single configuration step. The single-function programs are referred to herein as "wrappers". A "wrapper" is a program or script which is "wrapped" around a single function (e.g., a standalone NIM commend) which provides additional state and error checking before and after that single function. This additional checking makes the "wrapper" more suitable for use in automated scripts. Each of these new single-function programs acts independently to ensure prerequisite conditions are met, perform a single configuration step, and leave the installation server in a specific state for subsequent use by a succeeding program. A new "overall" server configuration program called "setup-server" invokes each of these new single-function programs in the correct order. The administrator is now free to invoke the single-function programs at will in whatever order he deems necessary and is appropriate, thus making the parallel, remote installation much more flexible and eliminating unnecessary steps.

The modular approach greatly aids remote, parallel installation by:

Making remote parallel installation more flexible. The administrator is now free to invoke only the necessary single-step programs. This makes it much easier to recover from an installation error.

Reducing the effort required to remotely install a single system (node). The new single-function programs allow for specific identification of the server or target system from which to perform the configuration operation. This can result in a significant reduction of time and resources when the administrator needs to install a single (or small number) of remote systems.

Reducing overall (re)installation time in the event of an installation failure. After correcting the problem, the administrator can complete the installation by simply rerunning the remaining steps, bypassing the previously completed steps.

Improving reliability. Since each component standalone program performs its own state analysis and error checking, errors are caught sooner and are easier to diagnose and correct.

The present invention provides parallel, remote migration where migration is defined as the ability to upgrade the operating system to a later release while preserving user data. Parallel migration is the ability to migrate many nodes simultaneously. Remote migration is the ability to initiate the node migration from any node in the system. By using resources strategically copied throughout a parallel, distributed computer system, the invention allows for wholesale migration of nodes from one release of AIX to another.

The present invention provides modular installation with repeatable, externally-invocable steps. Modular installation refers to the ability to define networks, resources and clients in relatively small software steps. Each step checks for entry conditions, and if met, executes the main body of the step. Upon completion of the main body, it checks for exit conditions. If exit conditions are met, it exits to the user. If not met, it undoes any partially successful steps and exits. Modular installation provides the ability to break up the installation of many workstations into easily repeatable steps. If any step fails, the system is left in an easily correctable state, and the step is ready to be rerun.

It is thus an object of the present invention to provide a program product recorded on a computer readable medium which includes a method of performing a software operation on a target of one of more processors in a distributed processing system wherein another processor is designated as a server. The method includes running a configuration program on the server to condition the server to serve on the target, the software operation which includes resource creation and object definitions; testing entry conditions in the configuration program for determining if entry conditions are met to serve the software operation on the target; if the entry conditions are met, serving the software operation on the target; at the completion of the software operation, testing exit conditions in the configuration program for determining if the software operation on the target completed successfully; if the exit conditions are met, exiting the software operation; returning to the configuration program to serve a second software operation on the target; and repeating until all software operations are served on the target.

It is another object of the invention to provide a program product which includes a method that issues an error message to the server and exits from the software operation if the entry conditions are not met.

It is another object of the present invention to provide a program product which includes a method that undoes any partial resource creation of object definition performed during the software operation, issues an error message to the server, and exits from the software operation if the exit conditions are not met.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
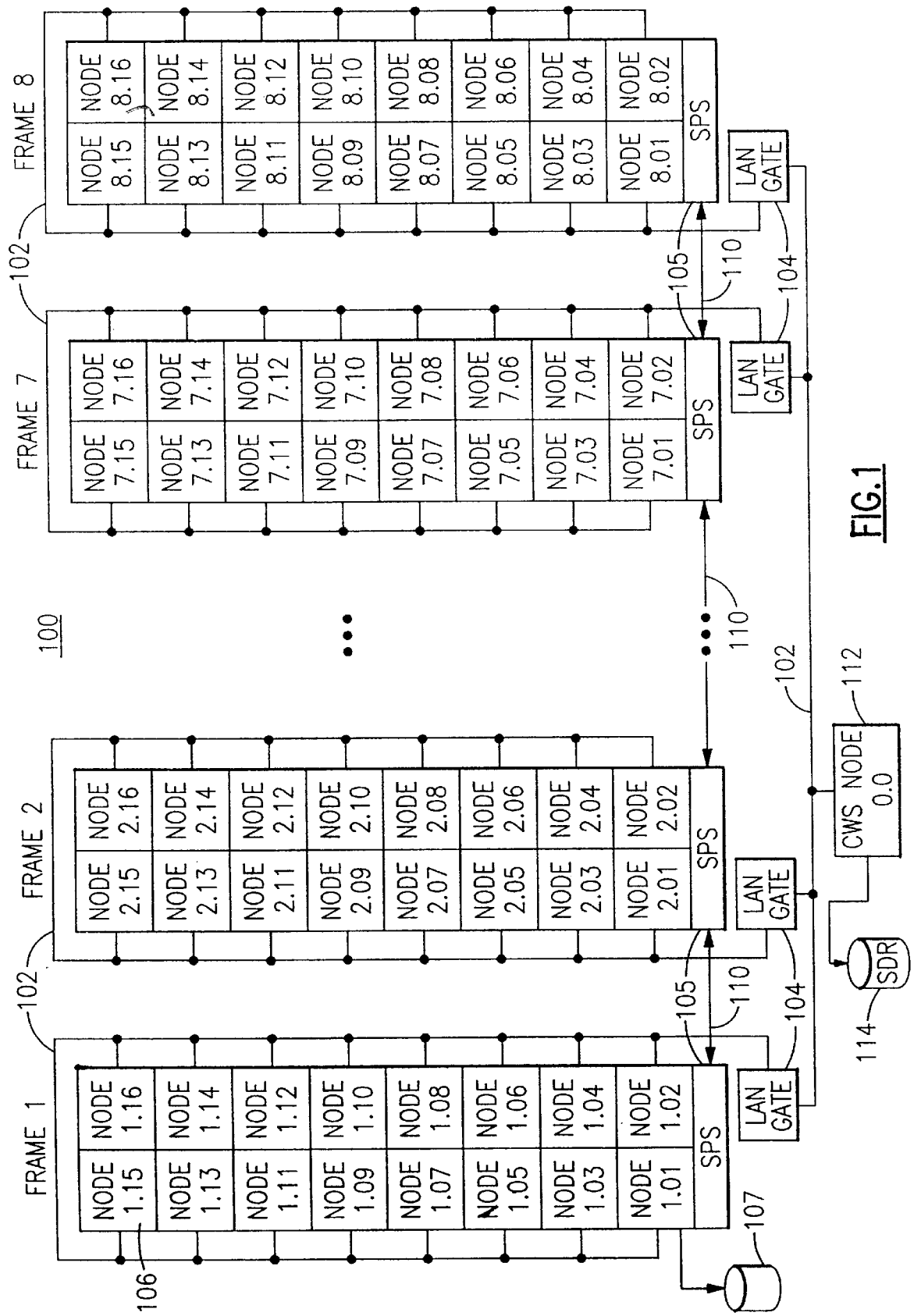
FIG. 1 is a schematic diagram of a parallel, distributed data processing system usable with the present invention.

FIG. 1 is a schematic diagram of a distributed computer system 100 useable with the present invention. The distributed computer system 100 may be an IBM RISC System/6000 Scalable POWERparallel Systems (SP) distributed computer system available from International Business Machines Corporation of Armonk, N.Y. The embodiment disclosed in FIG. 1 is an SP computer having a total of 8 frames, with each frame having up to 16 nodes, for a total of 128 nodes. All of the nodes 106 are joined by a local area network (LAN) 102. Each node 106 is a computer itself, and may be a RISC System/6000 workstation, as is well known by those skilled in the art.

All of the nodes in a frame of the SP computer 100 are included in a LAN segment which is joined by the other LAN segments through LAN gates 104. Also connected to the LAN 102, is a control workstation (CWS) 112 which controls operation of the SP computer 100. The control workstation has a direct access storage device (DASD) 114 referred to as the System Shared Disk on which is stored the system data repository (SDR) files. The SDR files include such information as a list of nodes that are in the system and their configuration, and includes resources and object definitions for each of the nodes 106. Each node 106 also includes a DASD device 107 for storing data processed by the SP computer 100.

In one embodiment, the nodes in each frame are also connected to an IBM Scalable POWERparallel switch (SPS) 105. Each of the SPS switches 105 of each frame is connected to neighboring SPS switches 105 of other frames by a bus 110.

As well understood in the art, the CWS node 112 sends system data and control signals to the frames of the SP computer 100 by means of the LAN 102 while messages and data may be sent from one to another of the nodes 106 by means of the high performance switches 105.

Figure 2:
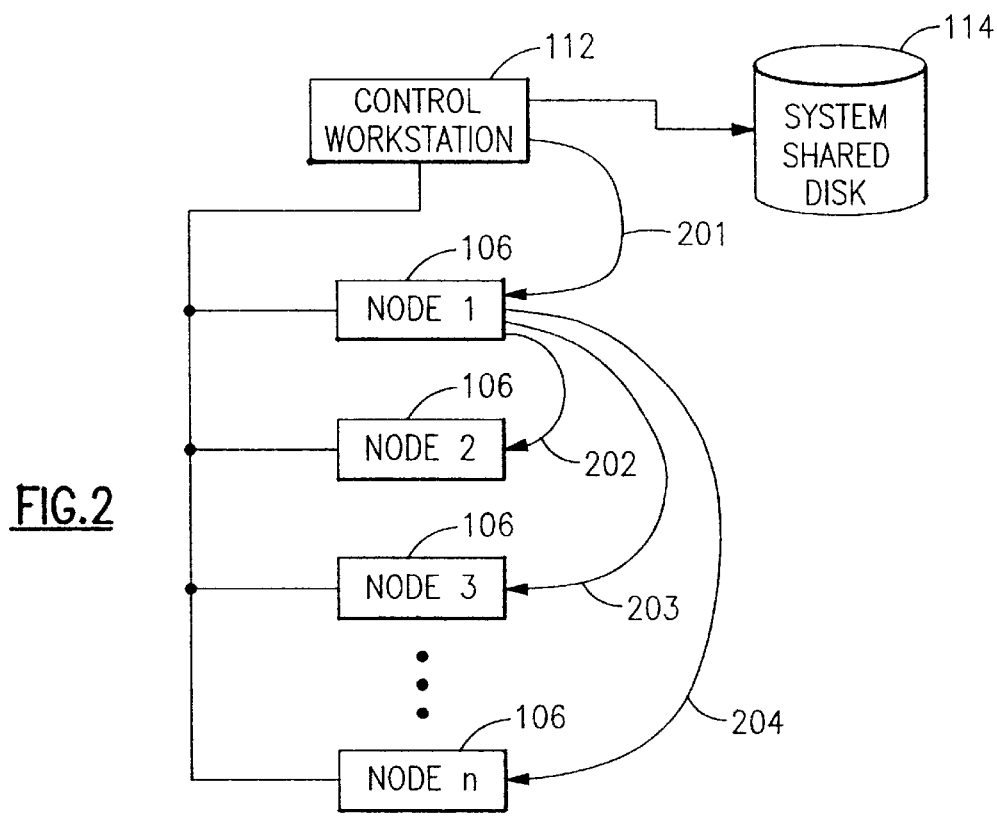
FIG. 2 is a diagram of a portion of the system of FIG. 1 illustrating a portion of the method of the present invention.

FIG. 2 is a portion of the system 100 of FIG. 1. The control workstation 112 provides a single point of control wherein the control workstation serves as the boot/install server for node 1, as shown by arrow 201. In turn, node 1 serves as the boot/install server for nodes 2, 3 and n, as shown by arrows 202, 203 and 204. It will be understood that as each type of operation (boot, install) is served on each node by its server, the resources created and object definitions for the node are stored on the System Shared Disk 114. It will be understood that the number of nodes, which may be referred to as the target, by a server may be varied to be one or more, as may be desired by the system administrator.

Figure 3:
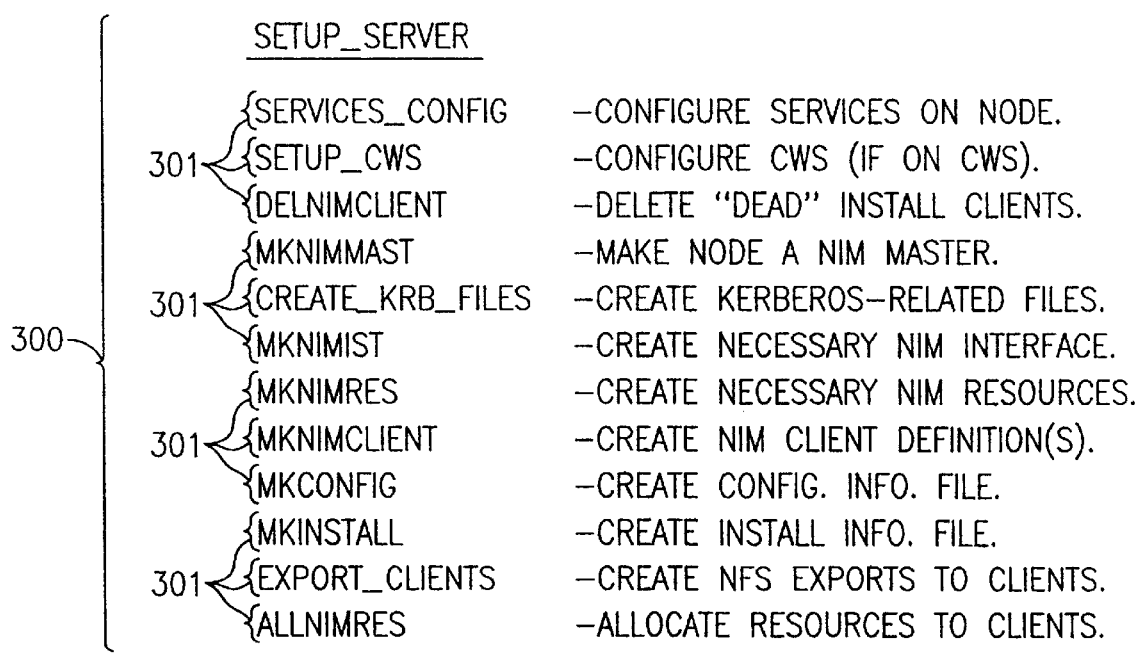
FIG. 3 is an illustration of the configuration program "setup_server" run on one of the nodes of FIG. 2 and showing the lower level, single-purpose scripts or wrappers which make up the "setup_server" program.

FIG. 3 is an illustration of the configuration program 300 ("setup_server") that is run on node 1 to condition it to serve nodes 2, 3 and n for the type of operation (install, migrate, boot from disk, diagnose, etc.) set for each node. The setup_server program 300 is a script which makes serial calls to lower level, single-purpose scripts 301, referred to herein as wrappers. The names of the wrappers 301 are shown in the left hand column of FIG. 3, and a short description of each individual wrapper is shown in the right hand column.

Figure 4:
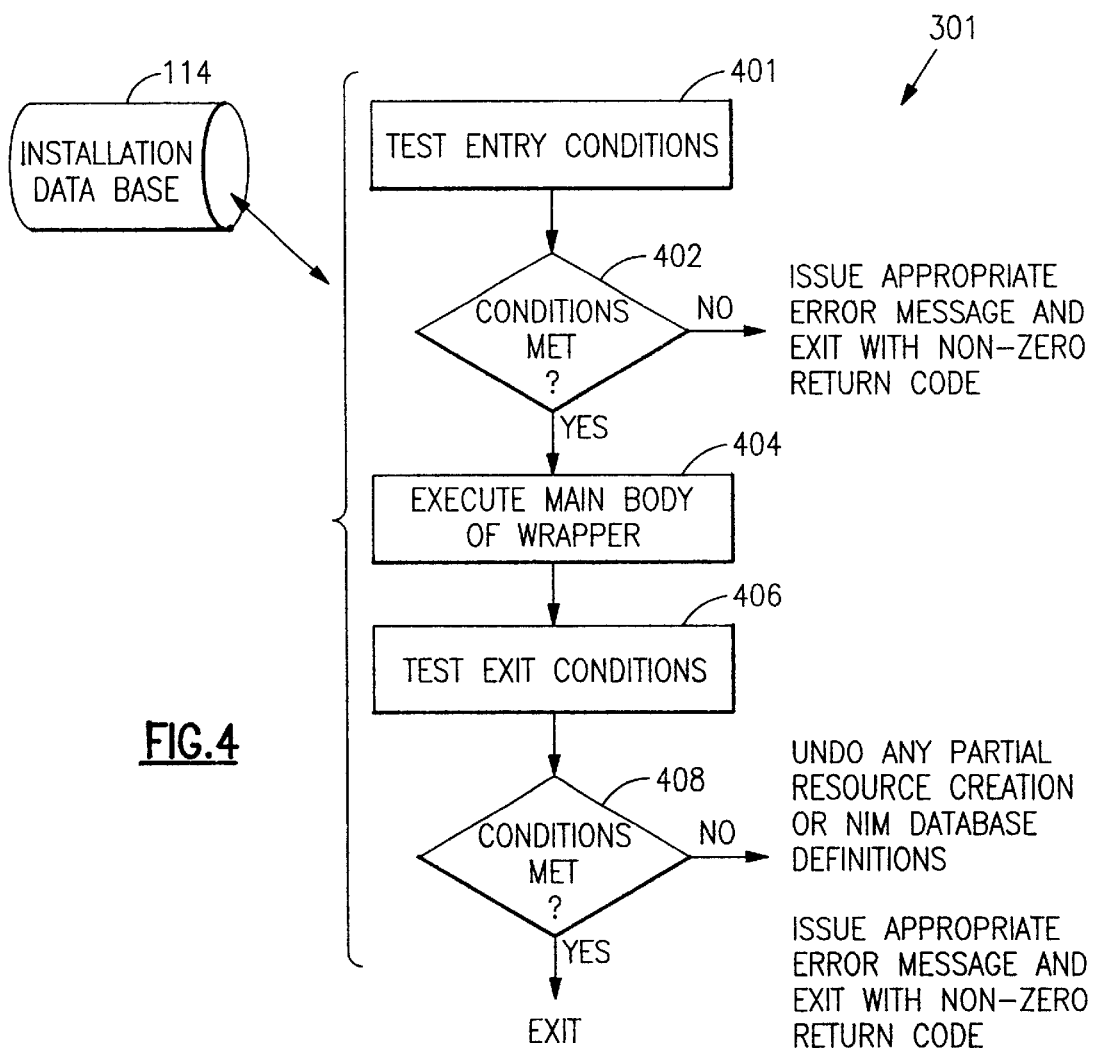
FIG. 4 is a flow diagram of a wrapper of FIG. 3.

FIG. 4 is a flow chart 400 of wrapper 301. At 401, the wrapper tests entry conditions to determine if initial entry conditions are met before executing the body of the wrapper. These entry conditions may include conditions or values of data in the installation data base in the System Shared Disk 114. The entry conditions may also include many conditions which are not related to the SDR data and, for instance, relate to conditions on the server and/or target systems themselves. Some of these conditions are the presence of certain files, the contents of certain systems files, etc. If the entry conditions are not met at 402, an appropriate error message is issued, and the wrapper exits with an error code, typically a non-zero return code. If the entry condition is met at 402, the main body of the wrapper is executed at 404. At 406, the exit conditions are tested. If the exit conditions are not met at 408, any operation resource creation or object definition is undone in the installation data base on System Shared Disk 114, and the appropriate error message is issued, and the wrapper exits with a non-zero return code to indicate an error. If the exit conditions are met at 408, the wrapper exits successfully. If any wrapper fails, the error condition can be corrected, and the single step rerun until it completes successfully.

Figure 5:
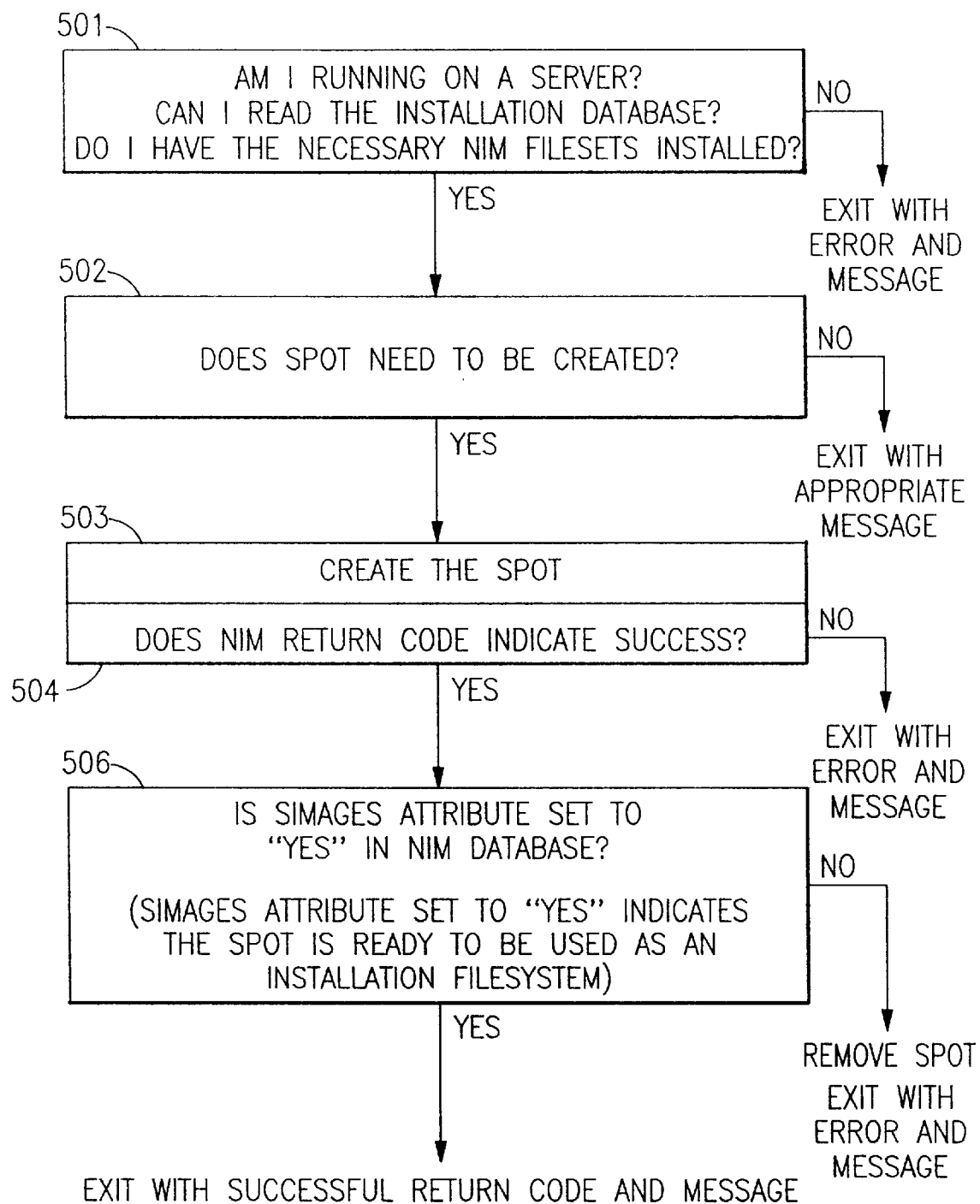
FIG. 5 is a flow chart illustrating an example of a wrapper checking entry and exit conditions.

FIG. 5 is an example of a wrapper checking entry and exit conditions and taking appropriate action. The illustrative wrapper shown in FIG. 5 creates a Shared Product Object Tree (SPOT) which is equivalent to a /usr file system for a booting node. The illustrative wrapper of FIG. 5 optionally removes the SPOT if any SPOT elements are missing. At 501, entry conditions are checked. The entry conditions in this illustration are: "am I running on a server?"; "can I read the installation Database?"; and "do I have the necessary NIM filesets installed?". A check is made at 502 to determine if SPOT needs to be created. If yes at 502, the body of the wrapper at 503 creates the SPOT. It will be understood that, at this point, NIM as described in the aforementioned NETWORK INSTALLATION MANAGEMENT GUIDE AND REFERENCE creates the SPOT. If the NIM return code indicates success at 504, the exit conditions are checked at 506. In the illustrative wrapper of FIG. 5, the exit conditions is: "is 'simages' attribute set to yes in NIM database?". As is known by those skilled in the art, the 'simages' attribute set to yes indicates that the SPOT is ready to be used as an installation file system. If the check at 506 is yes, the illustrative wrapper of FIG. 5 exits with a successful return code and message. If the check at 506 is no, the SPOT is removed, and the illustrative wrapper of FIG. 5 exits with an error message and error return code.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A program product on a computer readable medium for use in a distributed processing system having multiple processors, one processor being designated a server and one or more other processors being designated a target, the program product containing a method for performing software operations by the server on the target comprising the steps of:

a) running a configuration program on the server to condition the server to serve on the target a software operation on said target, said software operation including resource creation and object definitions;

b) testing entry conditions in said configuration program for determining if entry conditions are met to serve said software operation on said target;

c) in the event said entry conditions are met, serving said software operation on said target;

d) at the completion of said software operation, testing exit conditions in said configuration program for determining if said software operation on said target completed successfully;

e) in the event said exit conditions are met, exiting said software operation;

f) returning to said configuration program to serve a second software operation on said target; and g) repeating steps b–f until all software operations set for said target are completed.

2. The program product of claim 1 wherein step a) of the method contained thereon includes selecting said software operation from one of installing software on said target, migrating software from said server to said target, booting said target from a disk, or diagnosing said target.

3. The program product of claim 1 wherein the method contained thereon further comprises after step b), in the event said entry conditions are not met, the steps of issuing an error message to said server, and exiting from said software operation with an error return code indicating the software operation has become a failed software operation and has ceased due to an error.

4. The program product of claim 3 wherein the method contained thereon further comprises after step d), in the event said exit conditions are not met, the steps of undoing any partial resource creation or object definition performed during said software operation, issuing an error message to said server, and exiting from said software operation with an error return code indicating the software operation has become a failed software operation which has ceased due to an error.

* * * * *